United States Patent [19]
Ko et al.

[11] Patent Number: 5,506,330
[45] Date of Patent: Apr. 9, 1996

[54] POLYMERIZATION METHOD FOR PREPARING NON-HALOGENATED AROMATIC

[75] Inventors: Young H. Ko, Jeonlanam; Byung C. Jeon, Incheon; Seung D. Cho, Kwangju, all of Rep. of Korea

[73] Assignee: Korea Kumbo Petrochemical Co., Ltd., Seoul, Rep. of Korea

[21] Appl. No.: 268,841

[22] Filed: Aug. 15, 1994

Related U.S. Application Data

[63] Continuation-in-part of Ser. No. 140,319, Oct. 22, 1993, abandoned.

[30] Foreign Application Priority Data

Nov. 29, 1992 [KR] Rep. of Korea ............. 1992-22439

[51] Int. Cl.$^6$ ................................. C08G 63/00
[52] U.S. Cl. ................. 528/191; 528/179; 528/180; 528/181; 528/182
[58] Field of Search .................. 528/182, 179, 528/180, 181, 191

[56] References Cited

U.S. PATENT DOCUMENTS

| | | | |
|---|---|---|---|
| 4,066,623 | 1/1978 | Besso et al. | 528/128 |
| 4,426,511 | 1/1984 | Asada et al. | 528/128 |

Primary Examiner—James J. Seidleck
Assistant Examiner—Terressa M. Mosley
Attorney, Agent, or Firm—Harrison & Egbert

[57] ABSTRACT

The present invention relates to a polymerization method for preparing non-halogenated aromatic polyesters by a standard interfacial polymerization except the addition of a phase-transfer catalyst to the organic phase. More specifically, the present invention offers a method for substantially reducing the polymerization time and improving the reaction yield, by introducing a specific phase transfer catalyst, tetrabutyl ammonium bromide, to the organic phase.

1 Claim, 1 Drawing Sheet

POLYMERIZATION METHOD FOR PREPARING NON-HALOGENATED AROMATIC

RELATED APPLICATIONS

The present application is a continuation-in-part of U.S. patent application Ser. No. 08/140,319, filed on Oct. 22, 1993 now abandoned, and entitled "POLYMERIZATION METHOD FOR WHOLLY AROMATIC POLYESTERS".

BACKGROUND OF THE INVENTION

1. Field of the Invention

The present invention relates in general to an interfacial polymerization method for preparing a non-halogenated aromatic polyesters, and more particularly to improvements in a polymerization time for a bisphenol polyarylate with along an interfacial polymerization method and a phase-transfer catalyst.

2. Description of the Prior Art

As well known to the art, aromatic polyesters produced from a mixture of terephthalic acids and/or functional derivatives thereof and isophthalic acid and/or functional derivatives thereof, and a bisphenol have many superior properties, for example, mechanical properties such as tensile strength, elongation, flexural strength, bend recovery, impact strength, physical properties such as high thermal distortion temperature, good dimensional stability, and a high heat decomposition temperature, excellent electrical properties such as inherent resistivity, dielectric breakdown strength and arc resistance. Due to these superior properties, aromatic polyesters are known to be useful in a wide range of fields as various molded articles, films, fibers and coating materials produced by injection molding, extrusion molding, press molding, and other molding techniques.

Generally, these aromatic polyesters can be prepared, for example, using an interfacial polymerization method which comprises adding an aromatic dicarboxylic acid chloride dissolved in a water-immiscible organic solvent to an alkaline aqueous solution of a bisphenol as described in J. Polym., Sci., 40, 399(1959) to W. M. Eareckson, or Japanese Patent Publication Nos. Sho. 38-3589 and 40-1959, a solution polymerization method which comprises heating a bisphenol and an aromatic dicarboxylic acid chloride in an organic solvent as described in Ind. Eng. Chem., 51, 147(1959) to A. Conix and Japanese Patent Publication No. Sho. 37-5599, or a melt polymerization method which comprises heating a polyester of an aromatic dicarboxylic acid and a bisphenol as described in Japanese Patent Publication Nos. Sho. 38-15247 and 43-28119.

It has been known that the melt and the solution polymerization method have various problems. For example, when an aromatic polyester is produced by the solution polymerization method or the melt polymerization method, a high temperature or a reduced pressure is required. In addition, the aromatic polyesters produced by the two aforementioned methods often show low molecular weights and are frequently discolored. Accordingly, the interfacial polymerization method has taken the lead recently in producing the aromatic polyesters.

According to the literature, the reagents used in the interfacial polymerization are classified into two: first, dispersing agents such as surfactants which are capable of stabilizing the reaction system, as described in detail in J. Polym. Sci., 40, 339(1959) to W. M. Eareckson and J. Macromol. Sci. Chem., A13, 875(1979) to E. Z. Casassa, D. Y. Chao and M. Henson; second, phase-transfer catalysts such as quaternary ammonium salts which are capable of activating the transfer of reactants from an aqueous layer into an organic layer, as indicated in detail in J. Macrotool, Sci. Chem., A15, 683(1981) to P. W. Morgan. For example, the latter is added to a alkaline aqueous solution containing hisphenols to activate the transfer rate of bisphenolates produced therein into an organic layer.

In accordance with other literatures, it is more effective to use a phase-transfer catalyst which has higher lypophilicity. For example, as described in J. Polym. Sci.: Part A, Vol 26, 2039(1988) to Y. D. Lee and H. B. TSAI, tetrabutyl ammonium chloride (hereinafter "TBAC"), tfiethylbutyl ammonium chloride (hereinafter "TEBAC"), and tetraethyl ammonium chloride (hereinafter "TEAC") are effective in the interfacial polymerization and because the lypophilicity of a catalyst is proportional to the number of carbon atoms contained therein, TBAC is the most effective among those. Of course, TEBAC is more effective than TEAC.

In the prior art, the quaternary ammonium salt as phase-transfer catalysts are added into an aqueous solution to produce aromatic polyesters. For example, an alkaline aqueous solution of a bisphenol containing benzyltrimethyl ammonium chloride (hereinafter "BTMAC") is used in U.S. Pat. No. 4,229,332.

However, when BTMAC is added into the aqueous layer, the concentration of bisphenolate in the organic layer is increased slowly and this increasing phenomenon proceeds continuously in even case that 60 minutes elapses. In the event of some other catalysts, the transfer rate of bisphenolate from an aqueous layer to an organic layer is relatively high, but an equilibrium state is not reached even though 60 minutes elapses. Thus, such interfacial polymerization method requires a long reaction time.

On the other hand, to make certain halogenated aromatic polyesters, an organic solution of an acid chloride containing TEBAC is used in U.S. Pat. No. 4,066,623. The authors said that their invention, which is the inverse interfacial polymerization i.e. adding the aqueous phase to the organic phase, could reduce the mount of low molecular weight fraction which accompanies the formation of these polyesters when prepared by standard interfacial polymerization techniques.

However, when this inverse interfacial polymerization is applied in polymerization method for non-halogenated aromatic polyesters, the resulting polymers were obtained in low product yield with low solution viscosity.

SUMMARY OF THE INVENTION

For solving the aforementioned problems, the present inventors have recognized that there exists a need for a polymerization method for preparing a non-halogenated aromatic polyesters, capable of reducing a reaction time, simultaneously obtaining high reaction yield and high enough solution viscosity.

Therefore, it is an object of the present invention to provide an interfacial polymerization method for bisphenol polyarylates, improved in a reaction rate, a reaction yield and a solution viscosity in an economical aspect.

In one aspect of the presently claimed invention there is provided a method for preparing a non-halogenated aromatic polyesters having a repeating unit of the following general formula (I)

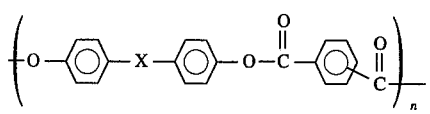

wherein X is selected from the group consisting of an alkylene group containing 1 to 4 carbon atoms; or alkylidene group containing 1 to 4 carbon atoms;

and n is an integer of not less than 100, by the standard interfacial polymerization of a non-halogenated bisphenol and mixture of isophthaloyl chloride and terephthaloyl chloride.

I. Adding the organic phase to the aqueous phase over a period of time of from 1% to 10% of the total polymerization time.

II. Providing an organic phase comprising a. an organic solvent, b. phthaloyl chloride mixture, and c. a catalytic amount of tetrabutyl ammonium bromide(TBAB) as the phase-transfer catalyst III. Providing an aqueous phase comprising a. demineralized water b. an alkali salt of said non-halogenated bisphenol, and c. a molecular weight-controlling agent having the general formula (II)

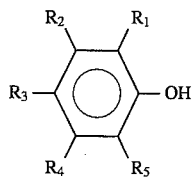

Wherein $R_1$, $R_2$, $R_3$, $R_4$, and $R_5$ are the same or different and represent the group consisting of a hydrogen, a halogen and an alkyl group consisting 1 to 4 carbon atoms.

BRIEF DESCRIPTION OF THE DRAWINGS

The above and other objects, features and advantages of the present invention will be more apparent from the following detailed description taken with reference to the accompanying drawings, in which.

DETAILED DESCRIPTION OF THE INVENTION

A phase-transfer catalyst used in an interfacial polymerization for aromatic polyesters has great influence on the reaction time, so that it is necessary to carefully select the catalyst and the usage thereof most suitable to the method.

Figure 1:
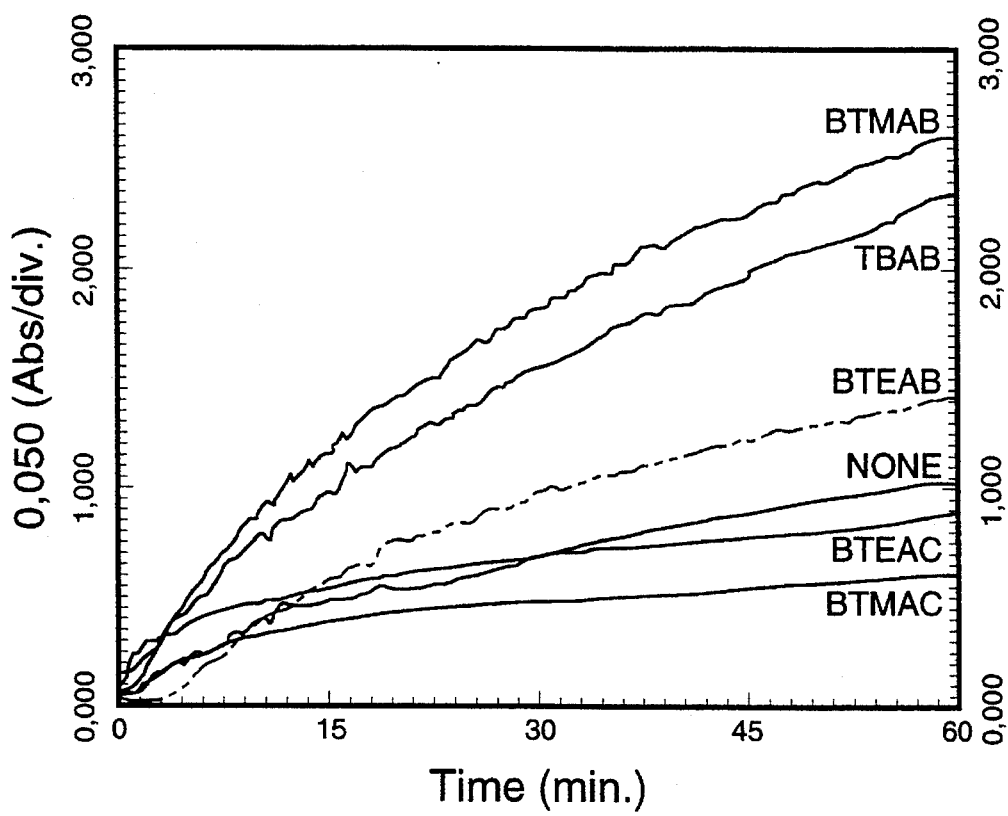
FIG. 1 is a graph illustrating the effect of phase-transfer catalysts on the transfer rate of bisphenolate from an aqueous layer to an organic layer when they are added into the aqueous layer.
Figure 2:
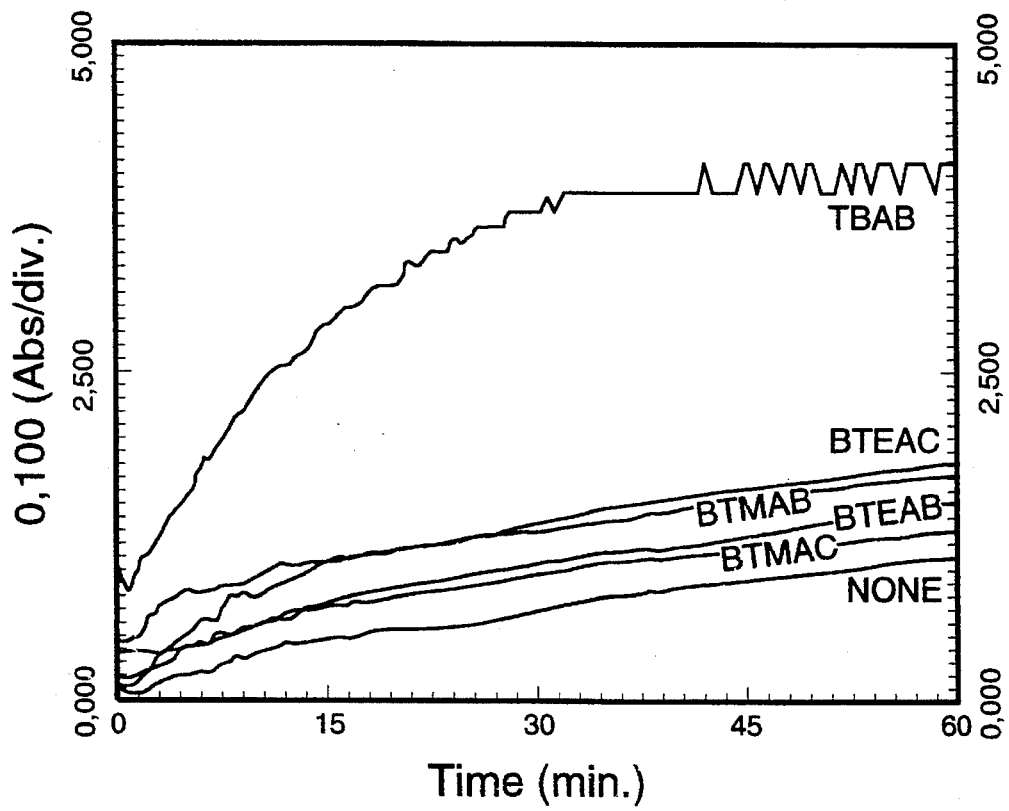
FIG. 2 is a graph illustrating the effect of phase-transfer catalysts on the transfer rate of bisphenolate from an aqueous layer to an organic layer when they are added into the organic layer.

To select a most suitable catalyst and a usage thereof, there is determined a transfer rate of bisphenolate from an aqueous layer to an organic layer in producing an aromatic polyester. For this reason, we have chosen several catalysts which are tetrabutyl ammonium bromide (hereinafter "TBAB"), tetrabutyl ammonium chloride (hereinafter "TBAC"), tetrabutyl ammonium fluoride (hereinafter "TBAF"), benzyltrimethyl ammonium chloride (hereinafter "BTMAC"), benzyltriethyl ammonium bromide (hereinafter "BTEAB), and benzyltriethyl ammonium chloride (hereinafter "BTEAC"). In practice, the concentration of phenylene group transferred into the organic layer per unit time is measured using an UV spectroscope at 240 nm in both cases of addition of the catalyst into an aqueous layer and addition of the catalyst into an organic layer. In both cases, the cell of an UV spectroscope is half filled with an organic solution and the remained half volume is then filled with an aqueous solution so carefully as not to shake the organic layer. The concentration variation of bisphenolate in the organic layer is measured by analyzing the concentration of phenyl groups in the same layer. FIG. 1 illustrates the phase-transfer rate of bisphenolates by various catalysts when they are added into an aqueous layer. On the other hand, FIG. 2 illustrates the rate when they added into an organic layer. As shown in FIG. 1, surprisingly the phase-transfer rate in case of addition of BTEAC and BTMAC is similiar to that in case of none. In addition, BTEAC, BTEAB and BTMAC let the concentration of the bisphenolate increase so slowly that it does not reach a satisfactory level even when 60 minutes elapses. In cases of TBAB and BTMAB, though the concentrations show a little faster increments, they never reach equilibrium states after 60 minutes. In the meantime, when the catalysts are added into an organic layer, as illustrated in FIG. 2, each of BTEAC, BTEAB, BTMAC and BTMAB has a little faster than none, but may be not said to be worth while catalysts. However, the addition of TBAB allows the concentration to be increased remarkably and an equilibrium to be reached within 30 minutes.

Therefore, when aromatic polyesters are produced by an interfacial polymerization method, the addition of a phase-transfer catalyst into an aqueous layer requires a longer reaction time. It is apparent that the lypophilicity of a catalyst has influence on the phase-transfer rate, as described in the aforementioned J. Polym. Sci.. In addition, the ionization degree of a catalyst has a function that affects the reaction rate. For example, when the phase-transfer catalysts exist in an aqueous layer, the ammonium bromide group catalysts are much more effective than the ammonium chloride group ones. In the meanwhile, when added into an organic layer, TBAB brings about greater effects than any other catalyst does. Consequently, when TBAB is added into an organic layer, the fastest phase-transfer rate of bisphenolate is resulted.

In accordance with the present invention, non-halogenated aromatic polyesters are produced by a novel method which comprises adding TBAB into an organic solution which contains dicarboxylic acid chlorides, and then adding the resulting organic solution to an alkaline aqueous solution which contains bisphenols. Along with the polymerization method, aromatic polyesters having desired physical properties may be obtained in a high yield within a short time.

In an interfacial polymerization method for non-halogenated aromatic polyesters, bisphenols are dissolved in an alkaline aqueous solution to form alkaline salts of bisphenol. Suitable alkaline salts include sodium hydroxide and potassium hydroxide. The alkaline salts formed in the aqueous solution are easily transferred into a layer of the organic solution by the catalyst. The amount of the tetrabutyl ammonium bromide as the phase-transfer catalyst is preferably on the order of 0.01 to 1.0% by mole referred to the bisphenol used.

With regard to solvents used in the present invention, solvents suitable to the interfacial polymerization method include chlorine-containing hydrocarbon compounds and chlorine-containing aromatic compounds which are immiscible with water. For example, these include methylene chloride, tetrachloroethane, benzene, chlorobenzene, nitrobenzene, ethyl ether, isopropyl ether and the like, and exclude solvents that have acid groups, hydroxy groups, or amine groups.

The amount of the monomers in the alkaline aqueous solution is preferably on the order of 5 to 20% by weight, and more preferably not more than 15% by weight in order to progress the interfacial polymerization reaction adequately. The amount of the monomers in the organic solution is preferably on the order of 9 to 20% by weight. For the satisfactory phase separation of the alkaline aqueous layer from the organic layer, the ratio of water to the organic solvent is preferably in a range of 1 to 1.3. In addition, it is advantageous to adjust the equivalent ratio of the alcohol and the acid to 1. That is, the mole ratio of the reactants (for example, bisphenol A:isophthalic acid chloride:terephthalic acid chloride) is preferably on the order of 1:0.8:0.2 to 1:0.2:0.8.

The addition rate of organic phase to aqueous phase is preferably on the order of 1% to 10% of the total polymerization time. For example, if too short the addition rate is, the reaction temperature can't be easily controlled because it is exothermic reaction. On the other hand, if too long the addition rate is, the molecular weight distribution of the resulting polymers is too broad.

Condensation is effected at temperature which may vary from about 15° C. and to about 40° C.

In order to produce the non-halogenated aromatic polyester having a desired inherent viscosity ($\eta_{inh}$), phenols having one hydroxyl group may be used as a molecular weight-controlling agents. Suitable molecular weight-controlling agent include para-cumyl phenol, ortho-phenyl phenol, para-phenyl phenol, meta-cresol, beta-naphthol, para-tertiary butyl phenol and the like. The amount of the molecular weight-controlling agent is preferably on the order of 0.5 to 5.0% by mole referred to the bisphenol used. This agent is dissolved in an alkaline aqueous solution having a pH value of not less than 11.

In order to insure good physical properties for the aromatic polyester used in the present invention, they should have an inherent viscosity number ($\eta_{inh}$), defined by the following equation; of about 0.3 to about 1.0 preferably 0.4 to 0.8.

$$\eta_{inh} = \frac{\ln t_1/t_2}{C}$$

wherein $t_1$ is the falling time (in seconds) of a solution of the polyester in a capillary tube of viscometer;

$t_2$ is the falling time(in seconds) of the solvent; and

C is the concentration (in g/dl) of the polyester in the solution. The inherent viscosity, as used herein, is determined in a mixture of phenol and 1,1,2,2-tetrachloroethane (weight ratio; 6:4) at 25° C. with the concentration of the polyester being 1 g/dl.

In accordance with the present invention, the non-halogenated aromatic polyester has a repeating unit of the following general formula (I):

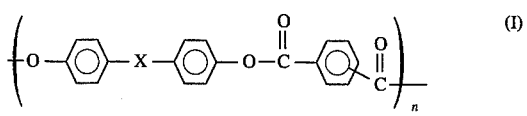

wherein X is selected from a group consisting of an alkylene group containing 1 to 4 carbon atoms or alkylidene group containing 1 to 4 carbon atoms.

The present invention is produced by adding an organic phase containing an organic solvent, a terephthalic acid chloride and a isophthalic acid chloride with mole ratio therebetween being a range of 8:2 to 2:8 and a catalytic amount of TBAB as a phase-transfer catalyst to an aqueous solution containing demineralized water, a bisphenol of the following formula (II):

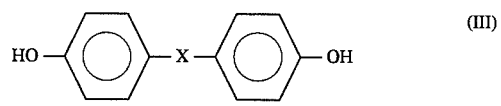

wherein X is selected from a group consisting of an alkylene group containing 1 to 4 carbon atoms or an alkylidene group containing 1 to 4 carbon atoms;

and, an alkaline salt in amounts sufficient to dissolve the bisphenol used, and a molecular weight-controlling agent having the following formula (II):

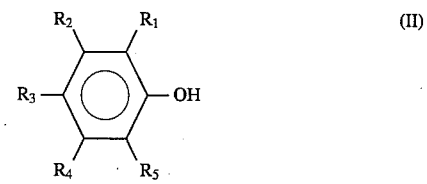

wherein $R_1$, $R_2$, $R_3$, $R_4$, and $R_5$, may be the same or different, and represent the group consisting of a hydrogen atom, a halogen atom, and an alkyl group containing 1 to 4 carbon atoms, and stirring them.

The following examples and comparative examples are merely intended to illustrate the present invention in further detail and should not by no means be considered to be limitative of the scope of the invention.

EXAMPLE 1

Preparation of Aqueous Phase 71.45 g of bisphenol-A, 25.42 g of sodium hydroxide, and 1.41 g of para-tertiary butylphenol with 410 ml of demineralized water were charged into the three-neck flask equipped with a mechanical stirrer, a thermometer and a condensor.

Preparation of Organic Phase

Each 31.82 g of terephthalic acid chloride and isophthalic acid chloride were dissolved in 425 ml of methylene chloride in combination with 0.151 g of TBAB as a phase-transfer catalyst.

Standard Interfacial Polymerization

The organic solution is then placed in a dropping funnel and added in 1 minute to the aqueous solution under conditions of agitation. After stirring for 0.5 hour with keeping a reaction temperature at 30° C., the reaction was then stopped, and the aqueous solution layer was removed from the reaction vessel. The remained methylene chloride layer was subjected to the treatment of removing by-products with an alkaline and an acidic aqueous solutions. Thereafter, the organic layer was washed with distilled water in several times, diluted into about 10% by weight and treated to precipitation in methanol. The precipitate was dried for at least 24 hours at 100° C. to give 112.2 g of polyester.

The inherent viscosity of the polymer was measured and the result (ρ inh) is given as shown in Table 1 together with the yield therefor.

EXAMPLE 2

A polymerization was carried out in a manner similar to Example 1 except that the reaction time was 1 hour instead of 0.5 hour. 110.61 g of polyester was yielded.

The inherent viscosity of the polymer was measured and the result (ρ inh) is given as shown in Table 1 together with the yield therefor.

EXAMPLE 3

A polymerization was carried out in a manner similar to Example 1 except that the reaction time was 2 hours instead of 0.5 hour. 110.61 g of polyester was yielded.

The inherent viscosity of the polymer was measured and the result (ρinh) is given as shown in Table 1 together with the yield therefor.

EXAMPLE 4

A polymerization was carried out in a manner similar to Example 2 except that 0.108 g of BTMAB instead of TBAB was used as a phase-transfer catalyst. 111.4 g of polyester was yielded.

The inherent viscosity of the polymer was measured and the result (ρinh) is given as shown in Table 1 together with the yield therefor.

EXAMPLE 5

A polymerization was carried out in a manner similar to Example 2 except that 0.087 g of BTMAC instead of TBAB was used as a phase-transfer catalyst. 112.0 g of polyester was yielded.

The inherent viscosity of the polymer was measured and the result (ρ inh) is given as shown in Table 1 together with the yield therefor.

EXAMPLE 6

A polymerization was carried out in a manner similar to Example 2 except that 0.087 g of BTEAB instead of TBAB was used as a phase-transfer catalyst. 112.2 g of polyester was yielded.

The inherent viscosity of the polymer was measured and the result (ρ inh) is given as shown in Table 1 together with the yield therefor.

EXAMPLE 7

A polymerization was carried out in a manner similar to Example 2 except that 0.107 g of BTEAC instead of TBAB was used as a phase-transfer catalyst. 111.6 g of polyester was yielded.

The inherent viscosity of the polymer was measured and the result (ρ inh) is given as shown in Table 1 together with the yield therefor.

COMPARATIVE EXAMPLE 1 TO 7

A polymerization was carried out in a manner similar to Examples aforementioned except that the phase-transfer catalysts were added into the aqueous solutions instead of the organic solutions.

The inherent viscosities of the polymers were measured and the results (ρinh) are given as shown in Table 1 together with the yields therefor.

COMPARATIVE EXAMPLE 8

A polymerization was carried out in a manner similar to example 1 aforementioned except that the order of addition was inverted, that is, by adding the aqueous phase to the organic phase.

The results are given as shown in table 1.

TABLE 1

| Example No. | PTC[a] | Layer[b] of PTC | Reaction Time (hr) | ηinh[c] (dl/g) | Yield (%) |
|---|---|---|---|---|---|
| 1 | TBAB | Organic | 0.5 | 0.53 | 98.8 |
| 2 | TBAB | Organic | 1.0 | 0.54 | 97.4 |
| 3 | TBAB | Organic | 2.0 | 0.54 | 97.4 |
| 4 | BTMAB | Organic | 1.0 | 0.38 | 98.1 |
| 5 | BTMAC | Organic | 1.0 | 0.45 | 98.6 |
| 6 | BTEAB | Organic | 1.0 | 0.43 | 98.8 |
| 7 | BTEAC | Organic | 1.0 | 0.44 | 98.2 |
| C. 1 | TBAB | Aqueous | 0.5 | 0.55 | 96.3 |
| C. 2 | TBAB | Aqueous | 1.0 | 0.55 | 97.6 |
| C. 3 | TBAB | Aqueous | 2.0 | 0.51 | 99.2 |
| C. 4 | BTMAB | Aqueous | 1.0 | 0.23 | 95.2 |
| C. 5 | BTMAC | Aqueous | 1.0 | 0.24 | 95.1 |
| C. 6 | BTEAB | Aqueous | 1.0 | 0.45 | 96.6 |
| C. 7 | BTEAC | Aqueous | 1.0 | 0.40 | 98.1 |
| C. 8 | TBAB | Organic | 0.5 | 0.30 | 89.4 |

[a] Phase-transfer catalyst
[b] Layer into which the phase-transfer catalyst was added.
[c] Inherent Viscosity in phenol/1,1,2,2-tetrachloroethane (6/4 weight ratio, at 25° C., 1 g/dl.)

EVALUATION TEST 1

Each $4.7 \times 10^{-4}$ mol of phase-transfer catalyst (e.g. TBAB: 0.151 g, BTMAB: 0.108 g, BTMAC: 0.087 g, BTEAB: 0.087 g, BTEAC:0.107 g) was added into a solution consisting of 400 ml of distilled water, 71.45 g (0.31 mol) of bisphenol A and 24.8 g (0.62 mol) of sodium hydroxide. The resultant alkaline aqueous solution was poured into a cell of an infrared spectroscope, the half volume of which had been filled with methylene chloride, so carefully as not to shake the organic layer. The concentration of phenylene group transferred into the organic layer per unit time was measured at 240 nm. The transfer rate of bisphenolate from the aqueous layer to the organic layer was determined by analyzing the concentration variation of phenylene groups per time.

EVALUATION TEST 2

Each $4.7 \times 10^{-4}$ mol of phase-transfer catalyst (e.g. TBAB: 0.151 g, BTMAB: 0.108 g, BTMAC: 0.087 g, BTEAB: 0.087 g, BTEAC:0.107 g) was added into 400 ml of methylene chloride. This organic solution was placed in a cell of an UV spectroscope. A solution consisting of 400 ml of distilled water, 71.45 g (0.31 mol) of bisphenol A and 24.8 g (0.62 mol) of sodium hydroxide was then poured into the cell so carefully that the organic layer may be not shaken. The concentration of phenylene group transferred into the organic layer per unit time was measured at 240 nm. The transfer rate of bisphenolate from the aqueous layer to the organic layer was determined by analyzing the concentration variation of phenylene groups per time.

What is claimed is:

1. An interfacial polymerization method for preparing a non-halogenated aromatic polyesters having a repeating unit of the following general formula (I)

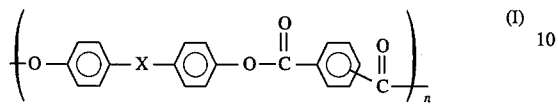

wherein X is selected from the group consisting of an alkylene group containing 1 to 4 carbon atoms or an alkylidene group containing 1 to 4 carbon atoms, and n is an integer of not less than 100, the method comprising the steps of:

providing an organic phase comprising an organic solvent, a terephthaloyl chloride and an isophthaloyl chloride with a mole ratio therebetween being 8:2 to 2:8, and a phase-transfer catalyst of tetrabutyl ammonium bromide;

providing an aqueous phase Comprising demineralized water, an alkali salt of a non-halogenated bisphenol, and an amount of para-tertiary butylphenol having a general formula of

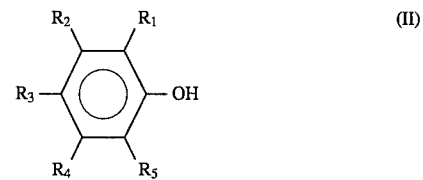

wherein $R_1$, $R_2$, $R_3$, $R_4$, $R_5$ are the same or different and represent the group consisting of a hydrogen, a halogen and an alkyl of 1 to 4 carbon atoms, said para-tertiary butylphenol being 0.5 to 5.0% by mole referred to said non-halogenated bisphenol, said tetrabutyl ammonium bromide being 0.01% to 1.0% by mole referred to said non-halogenated bisphenol; and adding said organic phase to said aqueous phase over a period of time from 1% to 10% of total polymerization time.

* * * * *